United States Patent
Kawazu et al.

(10) Patent No.: US 7,846,249 B2
(45) Date of Patent: Dec. 7, 2010

(54) PIGMENT AQUEOUS-MEDIUM DISPERSION AND COATING MATERIAL

(75) Inventors: Kenji Kawazu, Toyota (JP); Susumu Umemura, Aichi (JP); Hiroyoshi Mori, Tokushima (JP); Daisuke Suzuki, Tokushima (JP); Minoru Yamamoto, Tokushima (JP)

(73) Assignees: Otsuka Chemical Co., Ltd., Osaka (JP); Toyota Jidosha Kabushiki Kaisha, Toyota (JP)

( * ) Notice: Subject to any disclaimer, the term of this patent is extended or adjusted under 35 U.S.C. 154(b) by 564 days.

(21) Appl. No.: 11/886,297

(22) PCT Filed: Mar. 14, 2006

(86) PCT No.: PCT/JP2006/004983

§ 371 (c)(1),
(2), (4) Date: Sep. 14, 2007

(87) PCT Pub. No.: WO2006/098309

PCT Pub. Date: Sep. 21, 2006

(65) Prior Publication Data
US 2008/0210906 A1 Sep. 4, 2008

(30) Foreign Application Priority Data
Mar. 16, 2005 (JP) ............................... 2005-074314

(51) Int. Cl.
C09D 7/12 (2006.01)
C09D 201/00 (2006.01)

(52) U.S. Cl. .................. 106/415; 106/436; 423/608; 423/610; 523/334; 524/262; 524/394; 524/395; 524/398; 524/399; 524/413; 524/435

(58) Field of Classification Search ............... 106/415, 106/436; 423/608, 610; 523/334; 524/262, 524/394, 395, 398, 399, 413, 435
See application file for complete search history.

(56) References Cited

U.S. PATENT DOCUMENTS

| 5,746,819 | A | 5/1998 | Kostelnik et al. ........... 106/447 |
| 5,863,514 | A | 1/1999 | Sasaki et al. ................. 423/609 |
| 6,838,160 | B2 * | 1/2005 | Sasaki et al. ................. 428/220 |
| 2004/0234447 | A1 * | 11/2004 | Inubushi et al. .............. 423/598 |

FOREIGN PATENT DOCUMENTS

| JP | 6-329959 A | 11/1994 |
| JP | 2671949 B2 | 7/1997 |
| JP | 2979132 B2 | 9/1999 |
| JP | 11-278842 A | 10/1999 |
| JP | 3062497 B1 | 4/2000 |
| JP | 2000-281932 A | 10/2000 |
| JP | 2003-138146 A | 5/2003 |
| WO | 99/11574 A1 | 3/1999 |
| WO | 01/42140 A1 | 6/2001 |
| WO | 03/016218 A1 | 8/2002 |
| WO | 03/037797 A1 | 10/2002 |
| WO | WO 03/016218 * | 2/2003 |

OTHER PUBLICATIONS

Office Action dated May 11, 2010, in European Patent Application No. 06 715 642.2-2102.

* cited by examiner

*Primary Examiner*—C. Melissa Koslow
(74) *Attorney, Agent, or Firm*—Kubovcik & Kubovcik

(57) ABSTRACT

A pigment aqueous-medium dispersion and coating material which have no particle feeling and exhibit a highly excellent silky feeling, the pigment aqueous-medium dispersion is a dispersion of a photoluminescent pigment in an aqueous medium, characterized in that the photoluminescent pigment is flaky titanic acid obtained by treating layered titanate with acid and then reacting an organic basic compound with the treated layered titanate to delaminate, and the flaky titanic acid has an average longer diameter of 5 to 30 μm and an average thickness of 0.5 to 300 nm.

13 Claims, No Drawings

PIGMENT AQUEOUS-MEDIUM DISPERSION AND COATING MATERIAL

This application is a 371 of international application PCT/JP2006/304983 filed Mar. 14, 2006, which claims priority based on Japanese patent application No. 2005-074314 filed Mar. 16, 2005, which is incorporated herein by reference.

TECHNICAL FIELD

The present invention relates to a pigment dispersion liquid in an aqueous medium and a coating material using the same.

DESCRIPTION OF THE RELATED ART

Pigments, in which a titanium oxide layer is provided on the surface of a scaly material such as natural mica, synthetic mica, or scaly alumina, are conventionally used in many areas. These conventional pigments have strong glorious feeling and particle feeling (glittering feeling) and are used as a pigment imparting a pearly gloss.

However, a design exhibiting a fine luster, which is deep and graceful like silk, is desired as a design having a higher-grade feeling. As a pigment capable of imparting such a silky feeling, there is proposed a silky-gloss pigment in which a synthetic fluor phlogonite particle having a specified shape is coated with metal oxide such as titanium dioxide in Patent Literature 1.

In Patent Literature 2, Patent Literature 3 and Patent Literature 4, there are disclosed methods of producing layered titanate as described later. And, in Patent Literature 5 and Patent Literature 6, there are disclosed methods of producing a suspension of flaky titanic acid as described later.

Patent Literature 1: Patent Laid-Open No. 2000-281932
Patent Literature 2: Patent Registration No. 2979132
Patent Literature 3: International Publication No. WO 99/11574
Patent Literature 4: Patent Registration No. 3062497
Patent Literature 5: Patent Registration No. 2671949
Patent Literature 6: International Publication No. WO 03/037797

SUMMARY OF THE INVENTION

However, since the silky-gloss pigment proposed in the above Patent Literature 1 was a pigment in which mica was used as a base material and a layer of titanium oxide was provided on the surface of the mica base material, it had a strong particle feeling and did not exhibit a good silky feeling heretofore desired as a design having a high-grade feeling.

It is an object of the present invention to provide a pigment and a coating material which have no particle feeling and exhibit a highly excellent silky feeling.

A pigment dispersion liquid in an aqueous medium of the present invention is a dispersion liquid of a pigment in an aqueous medium, and is characterized in that the pigment is flaky titanic acid obtained by treating layered titanate with acid and then reacting an organic basic compound with the treated layered titanate to swell or delaminate an interlaminar portion and the flaky titanic acid has an average longer diameter of 5 to 30 m and an average thickness of 0.5 to 300 nm.

The pigment in the present invention is a flaky titanic acid obtained by treating a layered titanate with an acid and then reacting the treated layered titanate with an organic basic compound to swell or delaminate an interlaminar portion of the treated layered titanate, and by using such the pigment, it is possible to form a coating design exhibiting a silky feeling which cannot be attained by conventional pigments such as mica and alumina in scale form.

In order to develop the coating design exhibiting a silky feeling, the flaky titanic acid needs to be dispersed and oriented uniformly and in parallel in a resin coating, and since the pigment of the present invention is dispersed in an aqueous dispersion liquid, it can be dispersed and oriented uniformly and in parallel in a resin coating without causing flocculation and dispersion liquid defects in spite of having an extremely thin average thickness in comparison to conventional powder pigment. And, since the pigment of the present invention has the extremely smooth surface, scattering of light at the pigment surface is very low.

The flaky titanic acid in the present invention has an average longer diameter within a range of 5 to 30 µm. The average longer diameter refers to a particle diameter in a plane perpendicular to the direction of the thickness of the flake. The average longer diameter can be measured, for example, by the observation with transmission electron microscope (TEM). The average longer diameter can also be measured by mixing the flaky titanic acid in a coating and observing a cross section of the coating with TEM. Generally, longer diameters of about 100 flakes are measured and averaged to obtain the average longer diameter. When the average longer diameter is less than 5 µm, a silky feeling is impaired, and when it is more than 30 µm, it becomes difficult to disperse the flaky titanic acid uniformly and in parallel in a coating.

And, the flaky titanic acid in the present invention has an average thickness of 0.5 to 300 nm and preferably has an average thickness of 0.5 to 100 nm. When the average thickness is less than that of this range, it is generally difficult to produce the flaky titanic acid, and when it is more than that of this range, a particle feeling becomes conspicuous and a silky feeling is impaired.

The average thickness of the flaky titanic acid can also be measured by the observation with an electron microscope as with the above average longer diameter.

The flaky titanic acid in the present invention may be flaky titanic acid obtained by reacting an organic basic compound to swell or delaminate an interlaminar portion and then replacing a portion originated from the organic basic compound with a cesium ion in an aqueous medium. Since the organic basic compound has generally insufficient light resistance, there is apprehension that use of the organic basic compound leads to coloring of a coating, but by using the flaky titanic acid replaced with a cesium ion like this, this problem is avoided. In order to replace a portion originated from the organic basic compound with a cesium ion, a method, in which water-soluble cesium salt is added to an aqueous dispersion liquid of the flaky titanic acid and the resulting mixture is stirred for about 1 hour, may be used. As the water-soluble cesium salt, for example, cesium carbonate, cesium chloride, cesium nitrate, nitrate acetate, cesium sulfate, cesium fluoride, and cesium hydroxide can be used. The most preferred cesium salt is cesium carbonate. An amount of cesium salt to be added is preferably 0.1 to 1.0 equivalent weight of an ion-exchange capacity of the layered titanate described later, and more preferably 0.2 to 0.5 equivalent weight. When this amount is less than 0.1 equivalent weight, an amount of a portion originated from the organic basic compound to be replaced with a cesium ion becomes insufficient, and when it is more than 1.0 equivalent weight, it may be economically disadvantageous because a further effect cannot be found. And, it is desirable that excess cesium salt and an organic basic compound desorbed are removed by centrifugal washing after treating with a cesium ion.

And, the flaky titanic acid in the present invention may be one obtained by reacting an organic basic compound to swell or delaminate an interlaminar portion and then treating the flaky titanic acid with metal alkoxide in an aqueous medium. The flaky titanic acid to be an object of treatment may be the cesium ion-substituted flaky titanic acid. It is thought that by treating the flaky titanic acid with metal alkoxide, metal oxide or metal hydroxide produced by hydrolysis and a polycondensation reaction of metal alkoxide encompasses the surface of the flaky titanic acid and inhibits the degradation of a coating resin. Examples of metal alkoxides, which can be used in treating with metal alkoxide, include tetraalkoxysilanes such as tetramethoxysilane, tetraethoxysilane, tetraisopropoxysilane and tetrabutoxysilane, tetraalkoxyzirconiums such as tetra-n-propoxyzirconium, tetraisopropoxyzirconium and tetrabutoxyzirconium, and trialkoxyaluminum such as trimethoxyaluminum, triethoxyaluminum and tributoxyaluminum. A method of treating with metal alkoxide may be a method in which metal alkoxide is added to an aqueous dispersion liquid of the flaky titanic acid and the resulting mixture is stirred for 1 to 24 hours, preferably 6 to 12 hours. In order to increase treating efficiency, the mixture may be heated to 40 to 80° C., preferably 50 to 60° C. An amount of metal alkoxide to be added is preferably 10 to 200% by weight with respect to the flaky titanic acid, and more preferably 50 to 100% by weight. When this amount is less than 10% by weight, the effect of metal alkoxide is insufficient, and when it is more than 200% by weight, it may be economically disadvantageous because further improvements of the performances cannot be found. And, it is desirable that excess metal alkoxide is removed by centrifugal washing after treating with metal alkoxide.

And, the flaky titanic acid of the present invention may be one obtained by reacting an organic basic compound to swell or delaminate an interlaminar portion and then treating the flaky titanic acid with colloidal silica having an average particle diameter of 1 to 100 nm in an aqueous medium. The flaky titanic acid to be an object of treatment may be the cesium ion-substituted flaky titanic acid. It is thought that by treating the flaky titanic acid with colloidal silica, the colloidal silica encompasses the surface of the flaky titanic acid and inhibits the degradation of a coating resin. The colloidal silica, used in treating with colloidal silica, is one formed by dispersing amorphous silica in particle form in an amount about 10 to 50% in terms of solid matter in water, and an average particle diameter of the colloidal silica preferably falls within a range of 1 to 100 nm. When the average particle diameter is less than 1 nm, it is generally difficult to produce the colloidal silica, and when it is more than 100 nm, this may result in the deterioration of a coating design. As such colloidal silica, commercially available colloidal silica can be employed, and examples of colloidal silicas include SNOWTEX S, SNOWTEX 20, SNOWTEX N and SNOWTEX 50 produced by Nissan Chemical Industries, Ltd. A method of treating with colloidal silica may be a method in which colloidal silica is added to an aqueous dispersion liquid of the flaky titanic acid and the resulting mixture is stirred for 1 to 12 hours, preferably 3 to 6 hours. In order to increase treating efficiency, the mixture may be heated to 40 to 80° C., preferably 50 to 60° C. An amount of colloidal silica to be added is preferably 10 to 200% by weight with respect to the flaky titanic acid, and more preferably 50 to 100% by weight. When this amount is less than 10% by weight, the effect of colloidal silica is insufficient, and when it is more than 200% by weight, it becomes economically disadvantageous because a further effect cannot be found. And, it is desirable that excess colloidal silica is removed by centrifugal washing after treating with colloidal silica.

The flaky titanic acid in the present invention may be one obtained by reacting an organic basic compound to swell or delaminate an interlaminar portion and then treating the flaky titanic acid with a silane coupling agent in an aqueous medium. The flaky titanic acid to be an object of treatment may be the above-mentioned cesium ion-substituted flaky titanic acid. By treating the flaky titanic acid with the silane coupling agent, an adhesion property is improved. As a silane coupling agent, there can be used, for example, 3-isocyanatepropyltriethoxysilane, 3-glycidoxypropyltrimethoxysilane, 3-aminopropyltrimethoxysilane, 3-mercaptopropyltriethoxysilane, vinyltrimethoxysilane, 3-methacryloxypropyltriethoxysilane, triethoxyfluorosilane, 3-(triethoxysilyl)-2-methylpropylsuccinic anhydride, and 2-(4-chlorosulfonylphenyl)ethyltriethoxysilane. A method of treating with a silane coupling agent may be a method in which a liquid formed by dispersing a silane coupling agent in a nonionic surfactant is added to an aqueous dispersion liquid of the flaky titanic acid and the resulting mixture is stirred for 10 minutes to 5 hours, preferably 1 to 2 hours. In order to increase treating efficiency, the mixture may be heated to 40 to 80° C., preferably 40 to 60° C. An amount of the silane coupling agent to be added is preferably 10 to 200% by weight with respect to the flaky titanic acid, and more preferably 50 to 100% by weight. When this amount is less than 10% by weight, the effect of the silane coupling agent is insufficient, and when it is more than 200% by weight, it becomes economically disadvantageous because a further effect cannot be found. Examples of nonionic surfactants, in which the silane coupling agent is dispersed, include sorbitan fatty acid ester, glycerin fatty acid ester, polyoxyethylene sorbitan fatty acid ester, polyoxyethylene alkyl ether, polyoxyethylene alkyl phenyl ether, polyoxyethylene polyoxypropylene alkyl ether, polyoxyethylene glycol fatty acid ester, decaglycerin fatty acid ester and alkyl diethanol amide.

The coating material of the present invention can be obtained by mixing the above pigment dispersion liquid in an aqueous medium of the present invention and a resin emulsion dispersion. By using the coating material of the present invention, a coating having no particle feeling and exhibiting a highly excellent silky feeling can be formed. A mixing rate of the pigment dispersion liquid in an aqueous medium and the resin emulsion dispersion, is preferably 5 to 50% on the pigment weight concentration (PWC) equivalent basis of the flaky titanic acid and more preferably 10 to 30%. When the mixing rate is out of this range, a desired coating design may not be developed.

The coating material of the present invention may appropriately contain additives such as an ultraviolet absorber, an antioxidant, a leveling agent, a surface control agent, an anti-sagging agent, a thickner, an antifoaming agent and a lubricant to the extent of not impairing the superior design.

The pigment dispersion liquid in an aqueous medium of the present invention is a dispersion liquid formed by dispersing flaky titanic acid in an aqueous medium. Hereinafter, such a dispersion liquid of flaky titanic acid will be described in more detail.

<Dispersion Liquid of Flaky Titanic Acid>

The dispersion liquid of flaky titanic acid used in the present invention can be obtained, for example, by treating layered titanate with acid or hot water to obtain layered titanic acid and then reacting an organic basic compound having an effect of swelling an interlaminar portion with the layered titanic acid to swell or delaminate an interlaminar portion. Such a method is described in, for example, Patent Literature 5.

<Layered Titanate>

Layered titanate, which is a raw material, is obtained in the form of $Cs_{0.7}Ti_{1.83}O_4$, for example, by mixing cesium carbonate and titanium dioxide in proportions of 1:5.3 by mole ratio and baking this mixture at 800° C. according to a method disclosed in Patent Literature 2. Also, $K_{0.8}Li_{0.27}Ti_{1.73}O_4$ is obtained by mixing potassium carbonate, lithium carbonate and titanium dioxide in proportions of 3:1:6.5 by mole ratio, milling this mixture and baking the milled mixture at 800° C. according to a method disclosed in Patent Literature 3. Further, it is also possible to obtain layered titanate expressed by a general formula $A_XM_Y\square_ZTi_{2-(Y+Z)}O_4$, wherein A and M represent different monovalent, divalent or trivalent metals, $\square$ represents a defective site of Ti, X is a positive real number satisfying $0<X<1.0$, and Y and Z are zero or positive real numbers satisfying $0<Y+Z<1.0$, by employing alkali metal, alkali metal halide or sulfate as a flux, mixing this flux and a raw material in such a way that a weight ratio of the flux to the raw material is 0.1 to 2.0 and baking this mixture at TEMperature of 700 to 1200° C. according to a method disclosed in Patent Literature 4. A in the above general formula is monovalent, divalent or trivalent metal and is preferably at least one selected from K, Rb and Cs, and M is monovalent, divalent or trivalent metal, which is different from metal A, and is preferably at least one selected from Li, Mg, Zn, Cu, Fe, Al, Ga, Mn and Ni. Specific examples include $K_{0.80}Li_{0.27}Ti_{1.73}O_4$, $Rb_{0.75}Ti_{1.75}Li_{0.25}O_4$, $Cs_{0.70}Li_{0.23}Ti_{1.77}O_4$, $Ce_{0.70}\square_{0.18}Ti_{1.83}O_4$, $Ce_{0.70}Mg_{0.35}Ti_{1.65}O_4$, $K_{0.8}Mg_{0.4}Ti_{1.6}O_4$, $K_{0.8}Ni_{0.4}Ti_{1.6}O_4$, $K_{0.8}Zn_{0.4}Ti_{1.6}O_4$, $K_{0.8}Cu_{0.4}Ti_{1.6}O_4$, $K_{0.8}Fe_{0.8}Ti_{1.2}O_4$, $K_{0.8}Mn_{0.8}Ti_{1.2}O_4$, $K_{0.76}Li_{0.22}Mg_{0.05}Ti_{1.73}O_4$, and $K_{0.67}Li_{0.2}Al_{0.07}Ti_{1.73}O_4$. And, $K_{0.5-0.7}L_{0.27}Ti_{1.73}O_{3.85-3.95}$, which is obtained by acid cleaning $K_{0.8}L_{0.27}Ti_{1.73}O_4$ and then baking this according to a method disclosed in Patent Literature 6, can also be used.

<Layered Titanic Acid>

Layered titanic acid can be obtained, for example, by treating the above layered titanate with acid to replace a metal cation which can be exchanged with a hydrogen ion or a hydronium ion. The acid used in treating with acid is not particularly limited and mineral acids such as hydrochloric acid, sulfuric acid, nitric acid, phosphoric acid and boric acid, or organic acids may be used. Species of layered titanic acid, species and a concentration of acid, and a slurry concentration of layered titanic acid have effect on a metal cation-exchange rate. Generally, when an acid concentration decreases and a slurry concentration increases, the amount of interlaminar metal cation remaining increases and the layered titanic acid becomes resistant to delamination, and therefore the thickness of the delaminated flaky titanic acid becomes large.

When it is difficult to remove metal cation, acid treatment may be repeated as required.

<Organic Basic Compound Having an Effect of Swelling an Interlaminar Portion>

The dispersion liquid of flaky titanic acid is obtained by reacting an organic basic compound having an effect of swelling an interlaminar portion with the above layered titanic acid to swell or delaminate an interlaminar portion. Examples of organic basic compounds having an effect of swelling an interlaminar portion include primary, secondary and tertiary amines and salts thereof, alkanolamines and salts thereof, quaternary ammonium salts, phosphonium salts, and amino acid and salt thereof. Examples of primary amines include methylamine, ethylamine, n-propylamine, butylamine, pentylamine, hexylamine, octylamine, dodecylamine, stearylamine, 2-ethylhexylamine, 3-methoxypropylamine, 3-ethoxypropylamine and salts thereof. Examples of secondary amines include diethylamine, dipentylamine, dioctylamine, dibenzylamine, di(2-ethylhexyl)amine, di(3-ethoxypropyl)amine and salts thereof. Examples of tertiary amines include triethylamine, trioctylamine, tri(2-ethylhexyl)amine, tri(3-ethoxypropyl)amine, dipolyoxyethylenedodecylamine and salts thereof. Examples of alkanolamines include ethanolamine, diethanolamine, triethanolamine, isopropanolamine, diisopropanolamine, triisopropanolamine, N,N-dimethylethanolamine, 2-amino-2-methyl-1-propanol, and salts thereof. Examples of quaternary ammonium hydroxide salts include tetramethylammonium hydroxide, tetraethylammonium hydroxide, tetrapropylammonium hydroxide and tetrabutylammonium hydroxide. Examples of quaternary ammonium salts include dodecyltrimethylammonium salt, cetyltrimethylammonium salt, stearyltrimethylammonium salt, benzyltrimethylammonium salt, benzyltributylammonium salt, trimethylphenylammonium salt, dimethyldistearylammonium salt, dimethyldidecylammonium salt, dimethylstearylbenzylammonium salt, dodecylbis(2-hydroxyethyl) methylammonium salt, trioctylmethylammonium salt and dipolyoxyethylenedodecylmethylammonium.

Examples of phosphonium salts include organic phosphonium salts such as tetrabutylphosphonium salt, hexadecyltributylphosphonium salt, dodecyltributylphosphonium salt and dodecyltriphenylphosphonium salt. And, amino acids such as 12-aminododecanoic acid and aminocaproic acid, and salts thereof, and imines such as polyethyleneimine, and salts thereof can also be used.

And, these organic basic compounds may be used singly or as a mixture of several species in accordance with objectives. Particularly, a highly hydrophobic organic basic compound is preferably used in combination with a highly hydrophilic organic basic compound because the delamination of titanic acid does not adequately proceed when it is used singly.

In order to react an organic basic compound having an effect of swelling an interlaminar portion, a method, in which an organic basic compound or a solution obtained by diluting the organic basic compound with an aqueous medium is added to a dispersion liquid obtained by dispersing layered titanic acid after treating with acid or hot water in an aqueous medium under stirring, may be employed. Or, a method, in which the layered titanic acid or the dispersion liquid of the layered titanic acid is added to an aqueous solution of an organic basic compound under stirring, may also be employed.

The aqueous medium or the aqueous solution means water, a water-soluble medium or a mixed medium of water and a water-soluble medium, or a solution thereof.

Example of water-soluble mediums include alcohols such as methyl alcohol, ethyl alcohol, isopropyl alcohol and the like, ketones such as acetone and the like, ethers such as tetrahydrofuran, dioxane and the like, nitrites such as acetonitrile and the like, and esters such as ethyl acetate, propylene carbonate and the like.

An amount of the organic basic compound to be added is 0.3 to 10 equivalent weight of an ion-exchange capacity of the layered titanate, and preferably 0.5 to 2 equivalent weight. Herein, the ion-exchange capacity means an amount of a metal cation which can be exchanged, and for example when the layered titanate is expressed by a general formula $A_XM_Y\square_ZTi_{2-(Y+Z)}O_4$, it refers to a value which mx+ny represents assuming that a valence of A is m and a valence of M is n.

The flaky titanic acid preferably has an average longer diameter of 5 to 30 μm and an average thickness of 0.5 to 300 nm.

The average longer diameter of the flaky titanic acid substantially retains an average longer diameter of layered titanate, a raw material, as long as the titanic acid is not stirred with a strong shear force in a step of reacting the organic basic compound to delaminate.

EFFECT OF THE INVENTION

In accordance with the present invention, the pigment and the coating material using the same, having no particle feeling and exhibiting a highly excellent silky feeling, can be formed.

EMBODIMENTS OF THE INVENTION

Hereinafter, the present invention will be described specifically by way of examples and comparative examples, but the present invention is not limited to the following examples.

Synthesis of Dispersion Liquid of Flaky Titanic Acid

Synthetic Example 1

A raw material was prepared by dry milling and mixing 67.01 g of titanium oxide, 26.78 g of potassium carbonate, 12.04 g of potassium chloride and 5.08 g of lithium hydroxide, and it was baked at 1020° C. for 4 hours to obtain powder. 7.9 kg of 10.9% water slurry was prepared from the obtained powder, and to this, 470 g of a 10% aqueous solution of sulfuric acid was added, and this mixed slurry was stirred for 2 hours and its pH was adjusted to 7.0. Solid matter in the slurry was separated, washed with water and dried at 110° C., and then it was baked at 600° C. for 12 hours to obtain powder. The obtained white powder was layered titanate expressed by a chemical formula of $K_{0.6}Li_{0.27}Ti_{1.73}O_{3.9}$, and its average longer diameter was 15 μm.

65 g of this layered titanate was dispersed in 5 kg of 3.5% hydrochloric acid and the mixture was stirred and reacted at 40° C. for 2 hours, and then solid matter in the mixture was separated by suction filtration and washed with water. The remaining amount of $K_2O$ of layered titanic acid obtained was 2.0% and an ion-exchange rate of metal was 94%.

The whole layered titanic acid obtained was dispersed in 1.6 kg of deionized water, and to this dispersion liquid, a solution formed by dissolving 34.5 g of dimethylethanolamine in 0.4 kg of deionized water was added while stirring the dispersion liquid, and the resulting mixture was stirred at 40° C. for 12 hours to obtain a dispersion liquid of flaky titanic acid of pH 9.9. The concentration of this dispersion liquid was adjusted to 5.0% by weight by centrifuging this dispersion liquid at 10000 rpm for 10 minutes. With respect to the obtained dispersion liquid of flaky titanic acid, the settling of solid matter was not found even when it was left standing for a long time, and in a solid substance obtained by drying the dispersion liquid at 110° C. for 12 hours, a weight reduction above 200° C. in a TG/DTA analysis was 14.7% by weight and an interlaminar distance by an X-ray diffraction (XRD) analysis was 10.3 Å.

Synthetic Example 2

200 g of the dispersion liquid of flaky titanic acid of Synthetic Example 1 was diluted with deionized water so as to have a concentration of 1.7% by weight, and to this, 120 g of a 5% by weight aqueous solution of cesium carbonate was added while stirring the dispersion liquid, and the resulting mixture was stirred at room temperature for 1 hour to replace dimethylethanolammonium as an interlaminar ion of the flaky titanic acid with a cesium ion. By repeating three times an operation in which the dispersion liquid was centrifuged at 10000 rpm for 10 minutes and after reaming a supernatant, the dispersion liquid of flaky titanic acid settled and concentrated was re-diluted with deionized water, excess cesium carbonate and dimethylethanolamine desorbed were removed together with the supernatant. Then, the pH of the dispersion liquid of flaky titanic acid was adjusted to 7.9 by bubbling a carbon dioxide, and the concentration was adjusted to 5.0% by weight by re-centrifuging. With respect to the obtained dispersion liquid of flaky titanic acid, the settling of solid matter was not found even when it was left standing for a long time, and in a solid substance obtained by drying the dispersion liquid at 110° C. for 12 hours, a weight reduction above 200° C. in a TG/DTA analysis was 1.8% by weight, an interlaminar distance by an X-ray diffraction analysis (XRD) was 9.3 Å, and the content of $Cs_2O$ by a X-ray fluorescence analysis was 20.2% by weight.

Synthetic Example 3

200 g of the dispersion liquid of flaky titanic acid of Synthetic Example 2 was diluted with deionized water so as to have a concentration of 1% by weight and heated to 50° C., and to this, a solution formed by diluting 10 g of a colloidal silica solution (SNOWTEX N produced by Nissan Chemical Industries, Ltd., 20 weight %, an average particle diameter 10 to 20 nm) to 250 g with deionized water was added dropwise over 1 hour while stirring the dispersion liquid. After adding dropwise, this mixture was stirred at 50° C. for 5 hours and centrifuged at 10000 rpm for 10 minutes, and excess colloidal silica was removed by reaming a supernatant. With respect to the obtained dispersion liquid of flaky titanic acid, the settling of solid matter was not found even when it was left standing for a long time, and in a solid substance obtained by drying the dispersion liquid at 110° C. for 12 hours, the content of $SiO_2$ by a X-ray fluorescence analysis was 2.1% by weight.

Synthetic Example 4

200 g of the dispersion liquid of flaky titanic acid of Synthetic Example 2 was diluted with deionized water so as to have a concentration of 1% by weight, and to this, 150 g of a 10% by weight solution of tetraethoxysilane-ethanol was added dropwise over 1 hour while stirring the dispersion liquid. After adding dropwise, this mixture was stirred at 60° C. for 8 hours and centrifuged at 10000 rpm for 10 minutes, and excess tetraethoxysilane was removed by reaming a supernatant. With respect to the obtained dispersion liquid of flaky titanic acid, the settling of solid matter was not found even when it was left standing for a long time, and in a solid substance obtained by drying the dispersion liquid at 110° C. for 12 hours, the content of $SiO_2$ by a X-ray fluorescence analysis was 4.8% by weight.

Synthetic Example 5

To 200 g of the dispersion liquid of flaky titanic acid of Synthetic Example 2, a solution formed by dispersing 2 g of 3-glycidoxypropyltrimethoxysilane in 2 g of polyoxyethylene octyl phenyl ether was added while stirring the dispersion liquid, and the resulting mixture was stirred at 40° C. for 2 hours. With respect to the obtained dispersion liquid of flaky titanic acid, the settling of solid matter was not found even when it was left standing for a long time.

Synthetic Example 6

To 200 g of the dispersion liquid of flaky titanic acid of Synthetic Example 3, a solution formed by dispersing 2 g of 3-isocyanatepropyltriethoxysilane in 2 g of polyoxyethylene octyl phenyl ether was added while stirring the dispersion liquid, and the resulting mixture was stirred at 40° C. for 2 hours. With respect to the obtained dispersion liquid of flaky titanic acid, the settling of solid matter was not found even when it was left standing for a long time.

Preparation of Coating Material Solution and Glorious Coating

Example 1

The dispersion liquid of flaky titanic acid obtained in Synthetic Example 1 was mixed with an acrylic-melamine crosslinked emulsion coating material so as to be 20% on the PWC equivalent basis to prepare a solution of coating material. The foregoing solution of coating material was applied onto a white coating plate with a film applicator in such a way that a dried film thickness is 10 m and preheated at 80° C. for 10 minutes. Onto this, an acid acrylic-epoxy crosslinked clear coating material was applied in such a way that a dried film thickness is 35 m as a top coat, and it was baked at 140° C. for 25 minutes to prepare a glorious coating. It was verified that the flaky titanic acid having an average thickness of 50 nm and an average longer diameter of 3 m was dispersed and oriented uniformly and in parallel in a resin coating in a state of being closely packed by observing a cross section of the coating with TEM.

Examples 2 to 6

A glorious coating was prepared in the same manner as in Example 1 using the dispersion liquid of flaky titanic acid obtained in Synthetic Examples 2 to 6. In any observation of a cross section of a coating by TEM, it was verified that the flaky titanic acid was dispersed and oriented in a state similar to that of Example 1.

Comparative Example 1

Titania coated mica (trade name "Iriodin 120" produced by Merck Ltd.), a conventional pearl luster pigment, adjusted so as to be 10% on the PWC equivalent basis was used as a pigment, and a glorious coating was prepared in the same manner as in Example 1.

Comparative Example 2

Titania coated alumina (trade name "Xirallic" produced by Merck Ltd.), a conventional pearl luster pigment, adjusted so as to be 10% on the PWC equivalent basis was used as a pigment, and a glorious coating was prepared in the same manner as in Example 1.

Comparative Example 3

A 5% dispersion liquid of flaky titanic acid was synthesized in the same manner as in Synthetic Example 1 except for changing a baking temperature from 1020° C. to 820° C. In this time, the obtained layered titanate had an average longer diameter of 3 μm. Subsequently, a glorious coating was prepared in the same manner as in Example 1. It was verified that the flaky titanic acid having an average thickness of 50 nm and an average longer diameter of 3 μm was dispersed and oriented uniformly and in parallel in a resin coating in a state of being closely packed by observing a cross section of the coating with TEM.

Comparative Example 4

A 5% dispersion liquid of flaky titanic acid was synthesized in the same manner as in Synthetic Example 1 except for changing the amount of dimethylethanolamine to 10.4 g. In this time, with respect to the obtained dispersion liquid of flaky titanic acid, the settling of solid matter was found after left standing for a day. Subsequently, a glorious coating was prepared in the same manner as in Example 1. It was verified that the flaky titanic acid having an average thickness of 600 nm and an average longer diameter of 15 μm was dispersed and oriented uniformly and in parallel in a resin coating in a state of being closely packed by observing a cross section of the coating with TEM.

<Evaluation of Coating>

On glorious coatings of Examples 1 to 6 and Comparative Examples 1 and 2, their designs (particle feeling and silky feeling), adhesion and weather resistance were evaluated according to the following test methods.

<Particle Feeling>

A particle feeling was rated on a scale of white/black 3500 tones in glorious feeling measurement (acceptance angle 15 degree)

<Silky Feeling>

A silky feeling of a coating was rated according to the following criteria.

○: good silky feeling

Δ: poor silky feeling (the same level of conventional mica coating)

X: no a silky feeling

<Adhesion>

Peeling test of crossing cut portions (2 mm squares, 100 lattices) of a coated plate was made using a tape, and adhesion was evaluated.

<Weather Resistance>

A coated plate was subjected to an accelerated weathering test of 1000 hours using a Duty Cycle Sunshine Weather Meter WEL-SUN-DC (manufactured by SUGA TEST INSTRUMENTS CO., LTD., black panel temperature 65° C., rain mode 18 minutes every 120 minutes), and weather resistance was evaluated based on a change in color difference (ΔE) from the initiation of a test and a change in gloss (ΔG) at an acceptance angle of 60 degree.

<Results of Evaluation of Coating>

TABLE 1

| | Particle Feeling | Silky Feeling | Adhesion (number of lattices peeled off) | Weather Resistance | |
|---|---|---|---|---|---|
| | | | | ΔE | ΔG |
| Ex. 1 | 0 | ○ | 31 | 0.82 | 56 |
| Ex. 2 | 0 | ○ | 16 | 0.48 | 31 |
| Ex. 3 | 0 | ○ | 11 | 0.29 | 11 |
| Ex. 4 | 1 | ○ | 14 | 0.33 | 9 |
| Ex. 5 | 0 | ○ | 0 | 0.32 | 12 |
| Ex. 6 | 0 | ○ | 0 | 0.27 | 14 |
| Comp. Ex. 1 | 372 | Δ | 0 | 0.47 | 5 |
| Comp. Ex. 2 | 1018 | Δ | 0 | 0.32 | 13 |
| Comp. Ex. 3 | 122 | Δ | 38 | 0.91 | 55 |
| Comp. Ex. 4 | 918 | Δ | 41 | 0.71 | 49 |

As is apparent from the results of the evaluation of the coat, the coatings of Examples 1 to 6 have no particle feeling and have a more excellent silky feeling compared with those of Comparative Examples, and they have a highly excellent design. And, in Examples 5 and 6, an adhesion property and weather resistance are also improved.

The invention claimed is:

1. A pigment aqueous-medium dispersion being a dispersion of a pigment in an aqueous medium, wherein the pigment is a flaky titanic acid obtained by treating a layered titanate with an acid, reacting the treated layered titanate with an organic basic compound to swell or delaminate an interlaminar portion of the treated layered titanate and obtain an intermediate flaky titanic acid, and treating the intermediate flaky titanic acid with a metal alkoxide in an aqueous medium to obtain the flaky titanic acid, the flaky titanic acid having an average longer diameter of 5 to 30 μm and an average thickness of 0.5 to 300 nm.

2. A pigment aqueous-medium dispersion being a dispersion of a pigment in an aqueous medium, wherein the pigment is a flaky titanic acid obtained by treating as layered titanate with an acid, reacting the treated layered titanate with an organic basic compound to swell or delaminate an interlaminar portion of the treated layered titanate and obtain an intermediate flaky titanic acid, and treating the intermediate flaky titanic acid with colloidal silica having an average particle diameter of 1 to 100 nm in an aqueous medium to obtain the flaky titanic acid, the flaky titanic acid having an average longer diameter of 5 to 3 μm and an average thickness of 0.5 to 300 nm.

3. A pigment aqueous-medium dispersion being a dispersion of a pigment in an aqueous medium, wherein the pigment is a flaky titanic acid obtained by treating a layered titanate with an acid, reacting the treated layered titanate with an organic basic compound to swell or delaminate an interlaminar portion of the treated layered titanate and obtain an intermediate flaky titanic acid, and by treating the intermediate flaky titanic acid with a silane coupling agent in an aqueous medium to obtain the flaky titanic acid, the flaky titanic acid having an average longer diameter of 5 to 30 μm and an average thickness of 0.5 to 300 nm.

4. A coating material obtained by mixing a pigment dispersion in an aqueous medium and a resin emulsion solution, wherein the pigment is a flaky titanic acid obtained by treating a layered titanate with an acid and then reacting the treated layered titanate with an organic basic compound to swell or delaminate an interlaminar portion of the treated layered titanate, and the flaky titanic acid has an average longer diameter of 5 to 30 μm and an average thickness of 0.5 to 300 nm.

5. A coating material obtained by mixing a pigment dispersion in an aqueous medium and a resin emulsion solution, wherein the pigment is a flaky titanic acid obtained by treating a layered titanate with an acid and then reacting the treated layered titanate with an organic basic compound to swell or delaminate an interlaminar portion of the treated layer titanate, and the flaky titanic acid has an average longer diameter of 5 to 30 μm and an average thickness of 0.5 to 300 nm, and wherein the organic basic compound is replaced with cesium ion.

6. A coating material obtained by mixing the pigment aqueous-medium dispersion according to claim 1 and a resin emulsion dispersion.

7. A coating material obtained by mixing the pigment aqueous-medium dispersion according to claim 2 and a resin emulsion dispersion.

8. A coating material obtained by mixing the pigment aqueous-medium dispersion according to claim 3 and a resin emulsion dispersion.

9. The coating material according to claim 4, wherein a mixing rate of said pigment dispersion in an aqueous medium and the resin emulsion dispersion is 5 to 50% on a pigment weight concentration (PWC) equivalent basis of the flaky titanic acid.

10. The coating material according to claim 5, wherein a mixing rate of said pigment dispersion in an aqueous medium and the resin emulsion dispersion is 5 to 50% on a pigment weight concentration (PWC) equivalent basis of the flaky titanic acid.

11. The coating material according to claim 6, wherein a mixing rate of said pigment dispersion in an aqueous medium and the resin emulsion dispersion is 5 to 50% on a pigment weight concentration (PWC) equivalent basis of the flaky titanic acid.

12. The coating material according to claim 7, wherein a mixing rate of said pigment aqueous-medium dispersion and the resin emulsion dispersion is 5 to 50% on a pigment weight concentration (PWC) equivalent basis of the flaky titanic acid.

13. The coating material according to claim 8, wherein a mixing rate of said pigment aqueous-medium dispersion and the resin emulsion dispersion is 5 to 50% on a pigment weight concentration (PWC) equivalent basis of the flaky titanic acid.

* * * * *